(12) United States Patent
Sasaki et al.

(10) Patent No.: US 6,213,674 B1
(45) Date of Patent: Apr. 10, 2001

(54) BALL JOINT FOR A CABLE

(75) Inventors: Gen Sasaki; Makoto Fujino, both of Miyota-machi (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/375,155

(22) Filed: Aug. 16, 1999

(30) Foreign Application Priority Data

Apr. 8, 1999 (JP) .................................. 11-101310

(51) Int. Cl.[7] .............................. F16C 11/00; F16C 1/26
(52) U.S. Cl. .................. 403/122; 403/127; 74/502.6; 384/208
(58) Field of Search .................................. 403/122, 127, 403/128, 131, 135, 141, 142, 143; 74/502.6; 384/208; 254/389; 174/65 R

(56) References Cited

U.S. PATENT DOCUMENTS

| | | |
|---|---|---|
| 2,140,426 * | 12/1938 | Hodson . |
| 3,215,405 * | 11/1965 | Walsh . |
| 5,570,611 * | 11/1996 | Pospisil et al. . |
| 5,862,711 * | 1/1999 | Oda . |
| 5,911,790 * | 6/1999 | Bates ................................. 74/502.6 |

* cited by examiner

Primary Examiner—Lynne H. Browne
(74) Attorney, Agent, or Firm—Oliff & Berridge, PLC.

(57) ABSTRACT

At the top of an upside-down box as a retainer 20 a recessed portion 24 is provided, with which an outer ring 23 which is coupled spherically with the curved surface of the cubic body 22 is coupled, the holding plate 26 fixes the position of the outer ring 23, the hollow shaft 32 is inserted in the cable insertion hole 29 provided in the cubic body 22, the male screw portion of the tip end of the hollow shaft 32 is screwed in the female screw portion 36 to be unified while clamping the cubic body with the guide member 31 and the hollow shaft 32, the guide member 31 is provided with a horn like widened guiding hole 30, the cable 40 drawn out from the hollow shaft 32 is bent along the inside of the guiding hole 30 of the guide member 31, and the cable 40 is taken out through the outlet 41 provided on the side wall of the retainer 20, thereby the guide member 31, the cubic body 22 and the hollow shaft 32 follow the movement of the cable 40.

6 Claims, 4 Drawing Sheets

F I G. 1
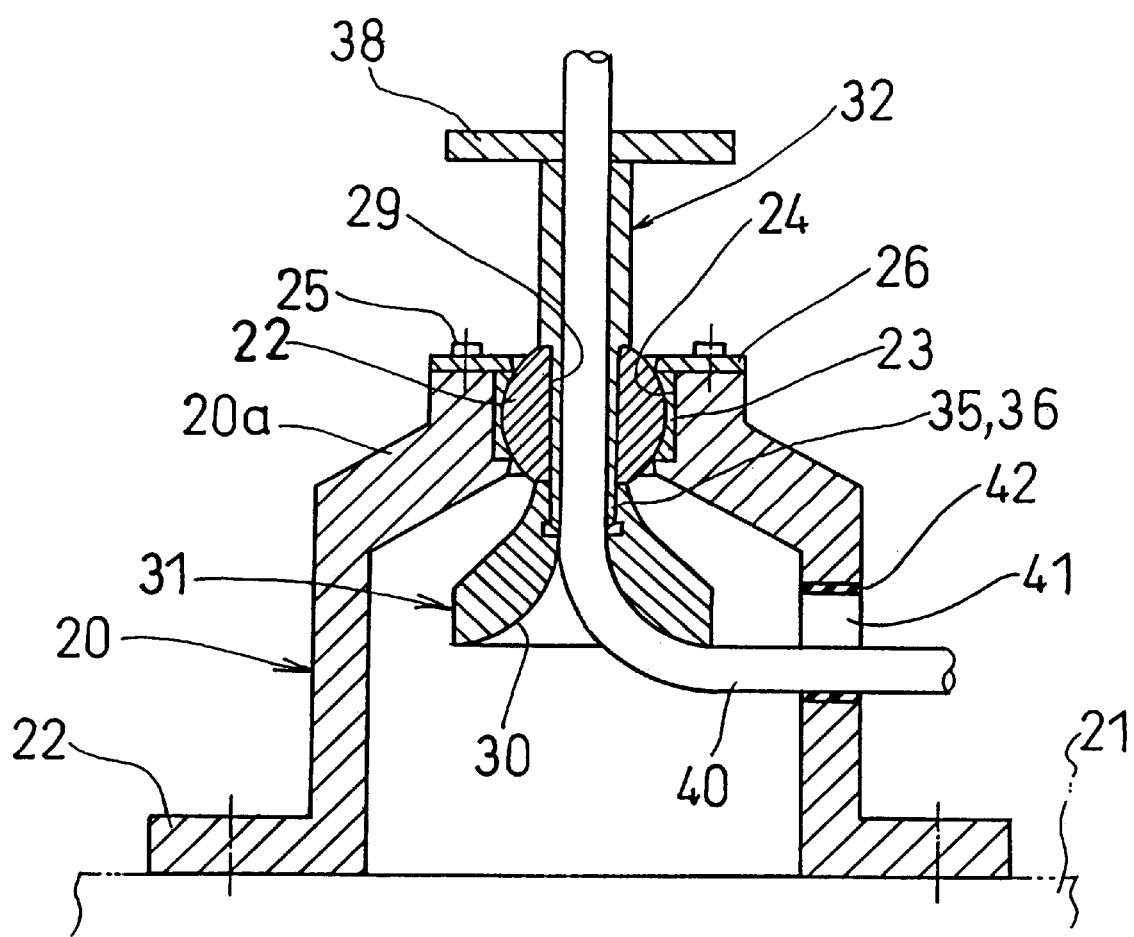

BALL JOINT FOR A CABLE

BACKGROUND OF THE INVENTION

1. Field of the Invention

The present invention relates to a ball joint for use in various industrial appliances, in particular, for use in a cable guide.

2. Description of the Related Art

Conventionally, a ball joint for a cable guide is structured as shown in FIG. 4. Reference numeral 1 designates a ball joint and 2 designates a cable. The ball joint 1 is interposed between a cable fixation table 3 for fixing one end of the cable and a cable supporting table 4 for supporting an intermediate portion of the cable and changing the drawn out direction approximately at 90 degrees. The ball joint 1 comprises a U-letter shaped retainer 5, a shaft 6 bridged between a pair of legs 5a of U-letter shaped retainer, a cubic body 7 coupled rotatably with the shaft 6 and an outer ring 8 to be coupled with the cubic surface of the cubic body 7. The retainer 5 is mounted on a mounting plate 9 with a bolt 10 connected to the bottom of the leg portions 3a of the cable fixation table 3 with bolt 9. The outer ring 8 is mounted on one end 4a of the supporting table 4 with bolt 11.

In operation, the cable 2 is drawn downward approximately vertically from the cable fixation table 3, then wound two or three times in loop on the cable supporting table 4, and further drawn out in an approximately horizontal direction through a ring guide 12 on the cable supporting table 4. In the above mentioned ball joint 1, the cubic body 7 rotates against shaft 6 and the outer ring 8 also rotates against the cubic body 7, so that the cable supporting table 4 can swing three-dimensionally, which guarantees the cable 2 is able to move freely.

According to the above mentioned cable guide system, if the cable 2 is not wound in a loop on the cable supporting table 4, it is swung excessively. An inordinate tension is put on the cable 2, or the cable 2 is forced to be bent at a sharp angle. Therefore, it has become unavoidable to wind the cable in a loop on the supporting table 4.

However, there is a problem where the cable 2 is wound in a loop on the cable supporting table 4, and the cable supporting table 4 is swinging. The cable 2 is apt to be damaged due to frictional contact between the cable and the cable supporting table. In addition, due to the three-dimensional swinging of the cable supporting table 4, the cable 2 is apt to be twisted at the looped portion, so that a lead in the cable can be broken.

SUMMARY OF THE INVENTION

The present invention has been made to solve the above problem and provides a ball joint for guiding a cable which guarantees a smooth movement of the cable, thereby contributing greatly to increase the endurance of the cable.

To attain the above object, in the present invention, a ball joint comprises a ball and an outer ring coupled with the cubic surface of the ball, which is supported by a stationary retainer. Said ball is pierced with a cable insertion hole which has an widened portion shaped like a horn toward one opening as a guide member provided adjacently to the ball for guiding a cable inserted in this insertion hole.

In the ball joint for cable guide thus constructed, by guiding a cable through the ball under the outer ring and inside the guide member which is in communication with the ball, the free movement of the cable is guaranteed because the ball and the guide member follow the movement of the cable in unitary manner. In addition, since the cable is guided along the inside and horn-like face of the guide member, it can be prevented from bending at a sharp angle or twisting.

In the present invention, a hollow shaft having screw threads at its end can be inserted in the cable insertion hole of the ball and connected by being screwed in the guide member, thereby those are made in a unit, and the hollow portion of the hollow shaft can be used as a cable guide path.

Also the retainer is configured as a housing. At the top where the outer ring supporting member is disposed and on the side of the retainer an outlet is provided for taking out the cable drawn out from the guide member. In this case, by engaging the guide member with the side of the retainer, a turning angle of the cubic body can be limited.

BRIEF EXPLANATION OF THE DRAWINGS

FIG. 1 is a sectional view showing the structure of the ball joint for cable guide of the present invention.

DETAILED DESCRIPTION OF PREFERRED EMBODIMENT

Hereinafter, an embodiment of the present invention will be explained based on the attached drawings.

Figure 2:
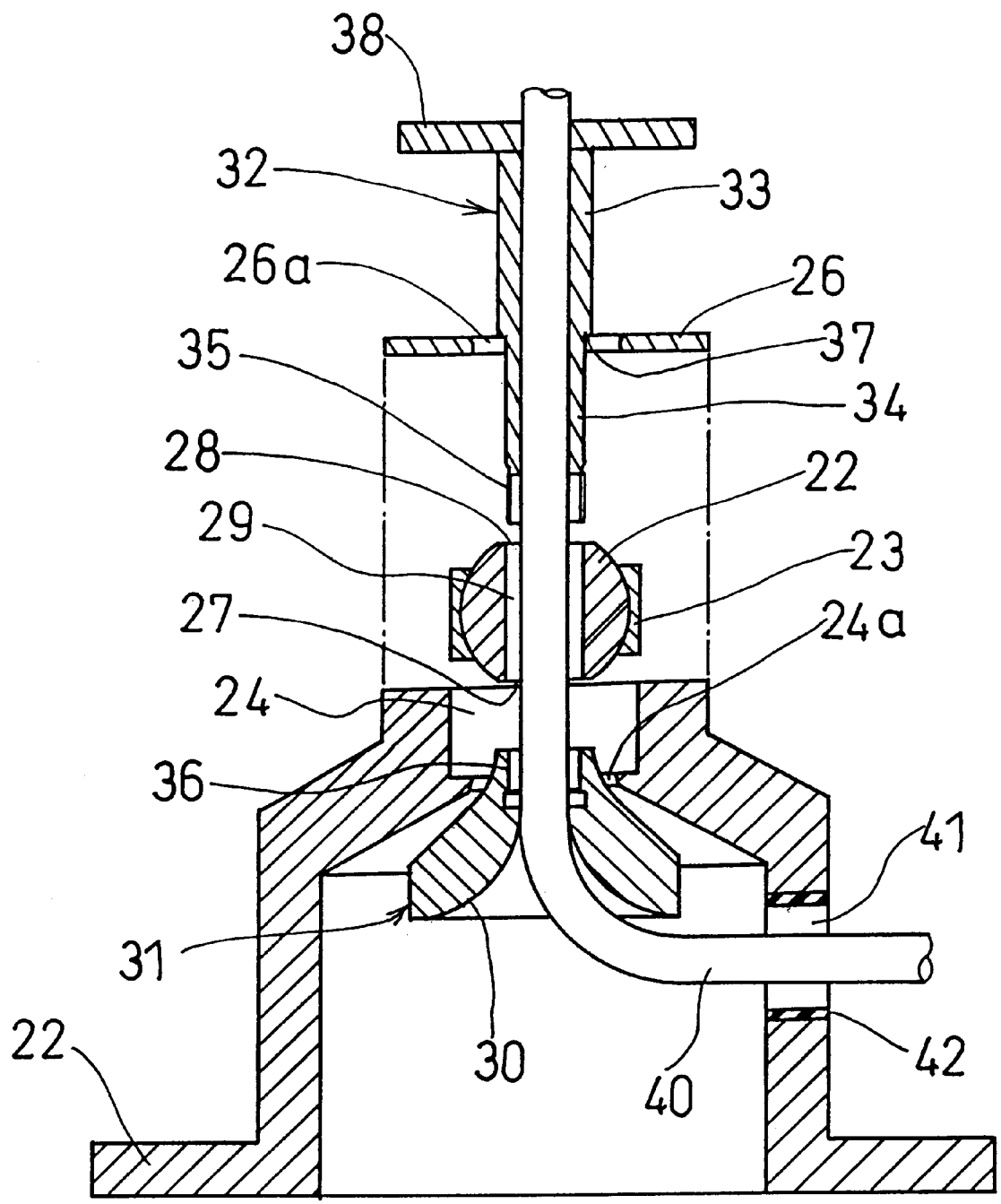
FIG. 2 is an exploded and sectional view showing the ball joint.
Figure 3:
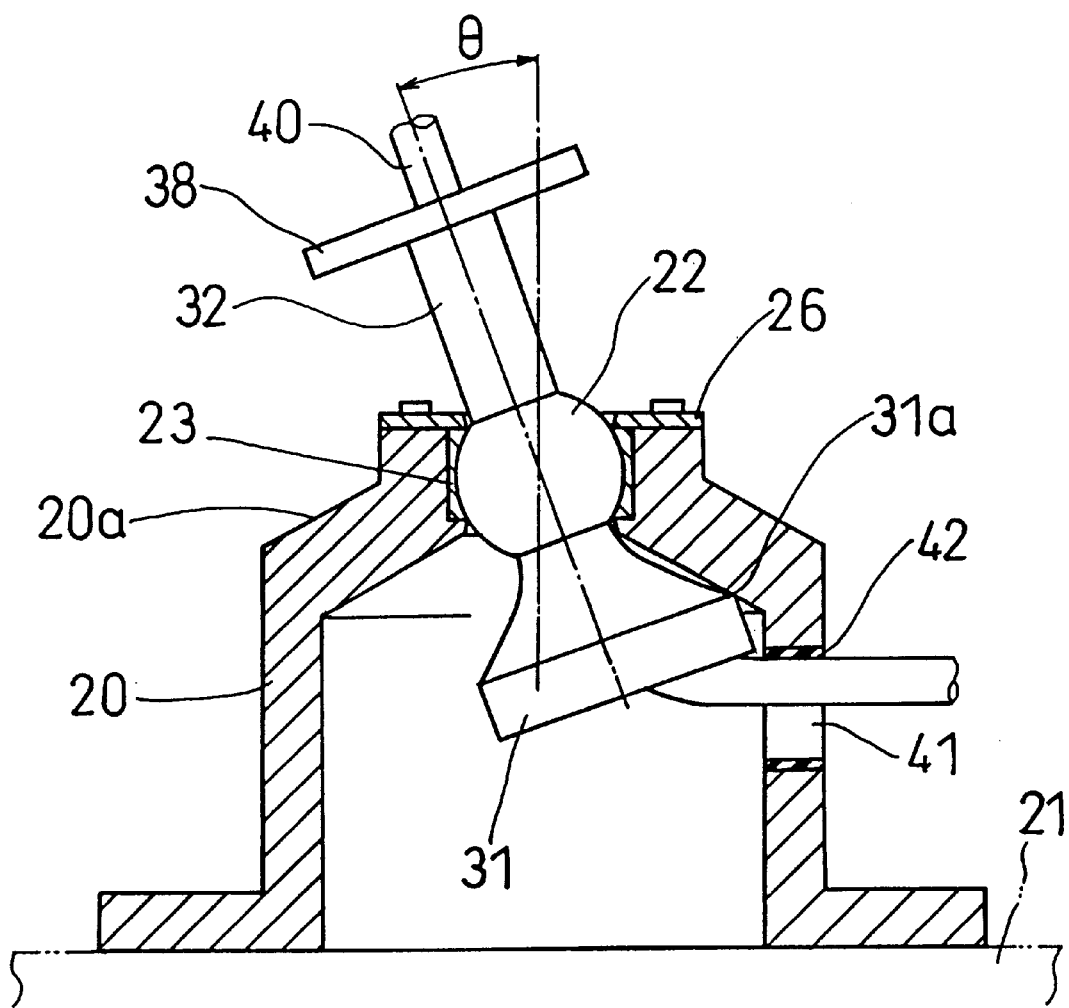
FIG. 3 is a sectional view of the operational structure of the ball joint.
Figure 4:
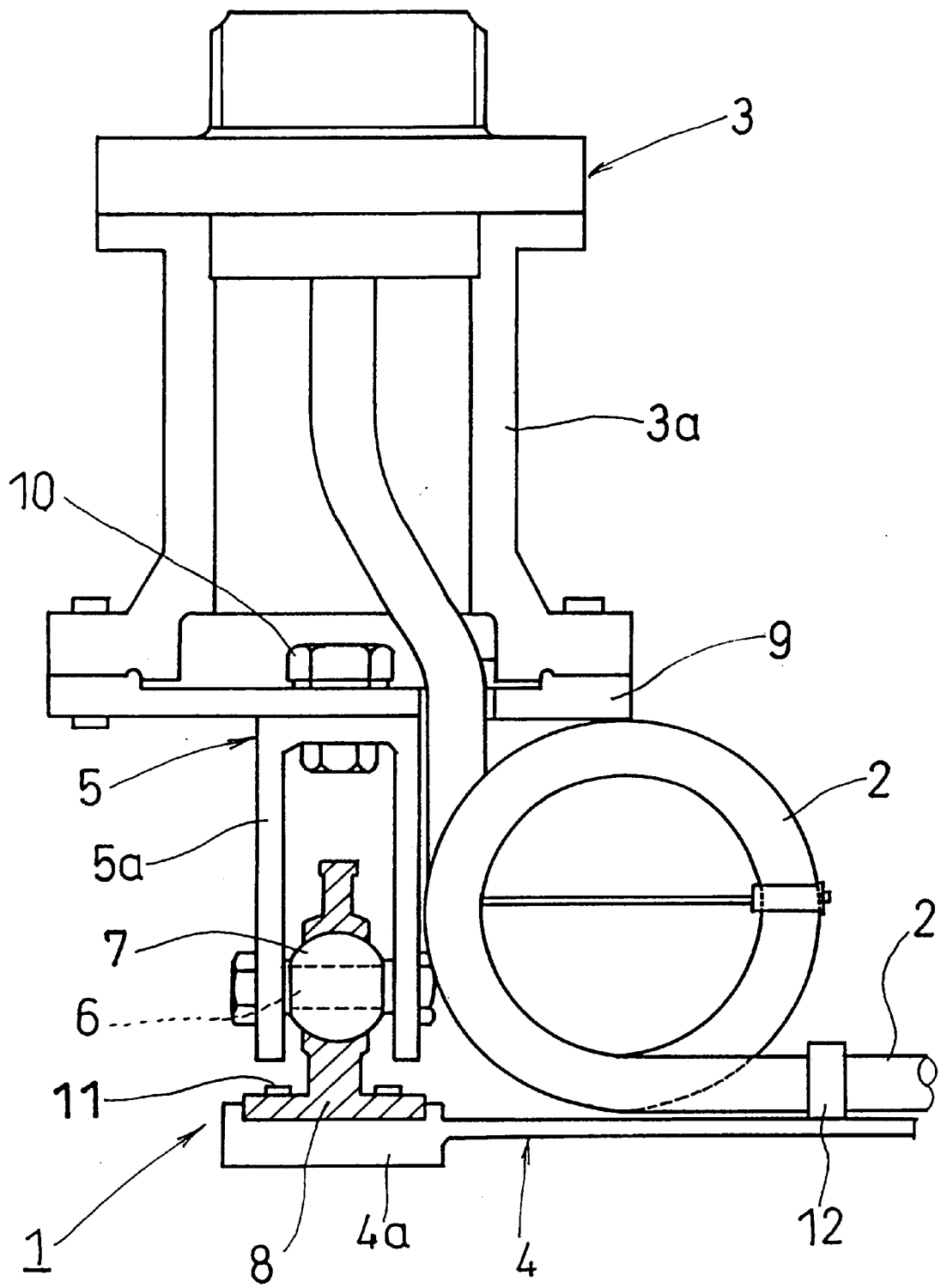
FIG. 4 is a side view showing the structure and the manner of using a conventional ball joint for cable guide.

FIGS. 1–3, show a ball joint for cable guide as an embodiment of the present invention. In these figures, reference numeral 20 designates a retainer housing. It is positioned on a stand 21 in an upside-down manner and fixed thereon by making use of a flange 22 provided around an opening peripheral of the box with bolts. The upside-down bottom 20a of the retainer has a conical shape. At the top of the conical shape, a recessed portion (an outer ring supporting portion) 24 for supporting an outer ring 23 to be coupled spherically with the cubic surface of the cubic body 22 is provided. The recessed portion 24 is formed large enough to completely accommodate the outer ring 23. The outer ring 23 is coupled with the recessed portion 24 by being clamped between the bottom of the recessed portion 24 and a holding plate 26 mounted on the retainer 20 with bolts 25. The cubic body 22 and the outer ring 23 are sub-assembled to become unitary, and where the outer ring 23 is coupled with the recessed portion 24, one portion of the cubic body 22 is adapted to be exposed through openings 24a, 26a (FIG. 2) provided in the bottom of the recessed portion 24 and the holding plate 26.

On the outer circumference of the cubic body 22, a pair of flat portions 27, 28 parallel with each other are formed, and through these flat portions 27, 28 and the cubic body 22, a piercing hole (cable insertion hole) 29 is provided (FIG. 2). A conically shaped guide member 31 and a hollow shaft 32 are provided to clamp the cubic body 22 in a unitary manner. The guide member 31 has an interior guide hole 30 which is shaped like a horn. The hollow shaft 32 has a stepped portion 37.

In more detail, the hollow shaft 32 comprises a large diameter portion 33 which is a little larger than the diameter of the piercing hole 29 and a small diameter portion 34 having a diameter a little smaller than the pierced hole 29. The end of that small diameter portion 34 is formed with male screw portion 35. A connection portion of the guide member 31 to the cubic body 22 is formed with a female screw portion 36 which is screwed with the male screw portion 35, whereby, in the piercing hole 29 of the cubic body 22, the small diameter portion 34 is inserted and the female portion 36 of the guide member 31, is lifted up until it abuts to the lower flat portion 27 of the cubic body 22. The hollow shaft 32 is descended until the stepped portion 37 between the large diameter portion 33 and the small diameter portion 34 of the hollow shaft 32 touch the upper flat portion 28 of the cubic body 22. Thereby, the guide member 31 and the hollow shaft 32 are rigidly assembled while clamping the cubic body 22 firmly in a unitary manner. For reference, 38 designates a handle for turning the hollow shaft 32 at the time of assembling.

Now, hollow shaft 32 has a diameter which is a little larger than the diameter of the cable 40. This hollow shaft 32, as described above, is extended to the inner side of the guide member 31 through the piercing hole 29 of the cubic body 22. Accordingly, the cable 40 is enabled to be drawn out vertically through the hollow shaft 32, the cubic body 22 and the guide member 31. On the other hand, on one side wall of the retainer 20 an outlet 41 for taking out the cable 40 is provided. The cable 40 drawn out downward from the guide member 31 is adapted to be drawn out horizontally making use of this outlet 41 while changing its drawn out direction approximately 90 degrees. For reference, in this outlet 41 a bushing 42 made of rubber or plastic is provided to act as a damper.

In assembling the above ball joint, an assembly preassembled with the cubic body 22 and the outer ring 23 is coupled with the recessed portion 24 of the top of the retainer 20. Subsequently the holding plate 26 is mounted on the top end of the retainer 20 with bolts 25 to fix the assembly in position. Next, the small diameter portion 34 of the hollow shaft 32 is inserted in the piercing hole 29 of the cubic body 22, and by screwing the male screw portion 35 of the top end of the small diameter portion 34 in the female portion 36 of the guide member 31, the guide member 31 and the hollow shaft 32 are united while clamping the cubic body 22, and thereby the assembly of the ball joint is finished. Hereinafter, the cable 40 is inserted in the hollow shaft 32 from the top, drawn out down the guide member 31, bent along the inner surface (right face) of the guide hole 30 configured like a horn and taken out horizontally from the cable outlet 41 of the retainer 20 by changing the drawn out direction at approximately 90 degrees from the vertical direction.

In the ball joint structured as mentioned above, when an outer force is applied to the cable 40, the cubic body 22 rotates within the outer ring 23, thereby the guide member 31 and the hollow shaft 32 swing in a unitary manner and free movement of the cable 40 is guaranteed. Then, since the cable 40 is bent along the inner surface of the horn configured guide hole 30 of the guide member 31, the cable is never bent at a sharp angle or twisted, and thereby damage of the cable 40 or of the leads inside the cable is prevented. In this embodiment in particular, since the cable 40 is supported by the hollow shaft 32 also in the upper side of the cubic body 22, the cable 40 does not come in contact with the holding plate 26 around the cubic body 2 and the outer ring 23. In addition, since a bushing 42 made of a damping material is coupled with the outlet 41, the cable 40 is not hung thereon, and so that the cable 40 does not interfere with the other members to prevent being damaged. For reference, the bushing 42 of the outlet 41 or cable 40 may be omitted, but in this case, it is to be considered to chamfer the edge (right face) of the outlet 41 for preventing the cable 40 from being hung thereon.

On the other hand, when a large force is applied to the cable 40, the guide member 31 and the hollow shaft 32 are apt to swing. In this case however, as shown in FIG. 3, one portion 31a of the guide member 31 abuts to the inclined inner surface of the bottom 20a of the retainer 20, which prevents the cubic body 22 from an excessive rotation more than a given angle, to prevent the hollow shaft 32 from swinging over a given angle θ. Thereby, there is no risk where the hollow shaft 32 swings more than necessary to abut to the holding plate 26, so that any damage of not only the outer ring 23 but also the hollow shaft 32 itself is prevented.

As mentioned above, according to the ball joint for cable guide of the present invention, the cable is able to move smoothly without setting it in loop, and damage of the cable or the lead in the cable can be avoided in advance to improve the endurance of the cable.

What is claimed is:

1. A ball joint for a cable guide comprises:

a retainer;

an outer ring;

a cubic body supported by the outer ring to be supported on the retainer;

a hollow shaft inserted through the cubic body such that a portion of the hollow shaft is projected;

a male screw thread formed on the projected portion of the hollow shaft;

a cable guiding hole made through the hollow shaft; and a conically shaped guide member to be screwed on the male screw thread on the projected portion of the hollow shaft, wherein the conically shaped guide member has a cable guiding hole that is increasingly wider in a direction away from the projected portion of the hollow shaft.

2. A ball joint for a cable guide according to claim 1, wherein the male screw thread on the projected portion of the hollow shaft is screwed in the conically shaped guide member to make the cubic body, the hollow shaft and the conically shaped guide member unified, and a hollow inside of the hollow shaft is used as a cable guiding path.

3. A ball joint for a cable guide according to claim 1 wherein the retainer housing has an outer ring supporting portion and on a side wall of the retainer housing, an outlet for taking out the cable drawn out from the guide member.

4. A ball joint for a cable guide according to claim 1, wherein the guide member engages with an inner side of the retainer to limit a turning angle of the cubic body.

5. A ball joint for a cable guide according to claim 2, wherein the retainer housing has an outer ring supporting portion and on a side wall of the retainer housing, an outlet for taking out the cable drawn out from the guide member.

6. A ball joint for a cable guide according to claim 2, wherein the guide member engages with an inner side of the retainer to limit a turning angle of the cubic body.

* * * * *